US012655587B1

(12) United States Patent
Dawson

(10) Patent No.: US 12,655,587 B1
(45) Date of Patent: Jun. 16, 2026

(54) ARAGONITE BASED INFILL MATERIAL

(71) Applicant: Dawson Holdings, LLC, Baton Rouge, LA (US)

(72) Inventor: Charles Dawson, Baton Rouge, LA (US)

(73) Assignee: Dawson Holdings, LLC, Baton Rouge, LA (US)

( * ) Notice: Subject to any disclaimer, the term of this patent is extended or adjusted under 35 U.S.C. 154(b) by 726 days.

(21) Appl. No.: 18/190,231

(22) Filed: Mar. 27, 2023

Related U.S. Application Data

(63) Continuation-in-part of application No. 17/099,175, filed on Nov. 16, 2020, now abandoned.

(60) Provisional application No. 63/323,722, filed on Mar. 25, 2022, provisional application No. 63/013,126, filed on Apr. 21, 2020.

(51) Int. Cl.
*E01C 13/08* (2006.01)
*C09C 1/02* (2006.01)
*C09C 3/12* (2006.01)
*E01C 13/02* (2006.01)

(52) U.S. Cl.
CPC .............. *E01C 13/08* (2013.01); *C09C 1/021* (2013.01); *C09C 3/12* (2013.01); *E01C 13/02* (2013.01)

(58) Field of Classification Search
CPC ......... E01C 13/02; E01C 13/08; C09C 1/021; C09C 3/12
USPC .......................................... 404/17, 71, 72, 75
See application file for complete search history.

(56) References Cited

U.S. PATENT DOCUMENTS

| | | | | |
|---|---|---|---|---|
| 11,427,971 B2 * | 8/2022 | Meherg | .................... | C05D 3/02 |
| 2010/0024686 A1 * | 2/2010 | Constantz | ............... | C01F 11/18 |
| | | | | 423/430 |

FOREIGN PATENT DOCUMENTS

| | | | | |
|---|---|---|---|---|
| CA | 3062039 A1 * | 12/2018 | ............. | C09C 1/021 |

* cited by examiner

*Primary Examiner* — Raymond W Addie
(74) *Attorney, Agent, or Firm* — Jones Walker LLP

(57) ABSTRACT

A method of constructing a sports field including the steps of (a) placing a drainage base on a section of ground to be occupied by the sports field; then (b) placing a turf over the drainage base; and finally, (c) distributing an infill material over the artificial turf with a loading of between 0.5 and 8 lbs/ft$^2$, wherein the infill material comprises at least 75% by weight orthorhombic CaCO$_3$.

13 Claims, 1 Drawing Sheet

87

75

1

90

82

80

76

79

78

84

85 gas phase liquid contact angle solid

ARAGONITE BASED INFILL MATERIAL

This application is a continuation-in-part of U.S. nonprovisional application Ser. No. 17/099,175, filed Nov. 16, 2020, which claims the benefit under 35 USC § 119 (e) of U.S. provisional application 63/013,126, filed on Apr. 21, 2020. This application also claims the benefit under 35 USC § 119 (e) of U.S. provisional application 63/323,722 filed Mar. 25, 2022, all of which are incorporated by reference herein in their entirety.

I. BACKGROUND

Various types of sports fields such as football, baseball and soccer fields, are increasingly being constructed using various artificial turf systems which have a natural grass texture, but also have greater longevity and less maintenance than natural turf systems. Generally, artificial turf is a synthetic turf system which includes a grass layer made of a plurality of pile-fibers and an infill composed of particles or chips distributed between the pile-fibers. In some cases, the infill material consists of granulated rubber chips or particles. However, such rubber particles have many disadvantages, include degrading in sunlight, becoming soft and sticky in warm Summer temperatures, and having an unpleasant odor. When such rubber chips are produced from recycled tires, there is the concern of embedded heavy metals being released and inhaled by persons using the sports fields.

Sand has also been used as an infill material. But sand has its own disadvantages, including concerns regarding players being placed at higher risk of silicosis from inhaling silica in the form of fine sand dust. An improve infill material which overcomes many of the disadvantages of prior art infill materials would be a welcome advancement in the art.

II. SUMMARY OF SELECTED EMBODIMENTS OF THE INVENTION

One embodiment of the invention is a method of constructing a sports field. The steps of the method first comprise (a) placing a drainage base on a section of ground to be occupied by the sports field; then (b) placing a turf over the drainage base; and finally, (c) distributing an infill material over the artificial turf with a loading of between 0.5 and 8 lbs/ft$^2$, wherein the infill material comprises at least 75% by weight orthorhombic CaCO$_3$.

Another embodiment is constructing a play area by placing this infill material at a depth of at least 2 inches across the designated play area.

A further embodiment is a bagged non-silica or low-silica play material comprised of 100 lbs or less of the infill material placed in a sealed flexible container.

III. BRIEF DESCRIPTION OF THE DRAWINGS

IV. DETAILED DESCRIPTION OF SELECTED EMBODIMENTS

Figures 1, 2:
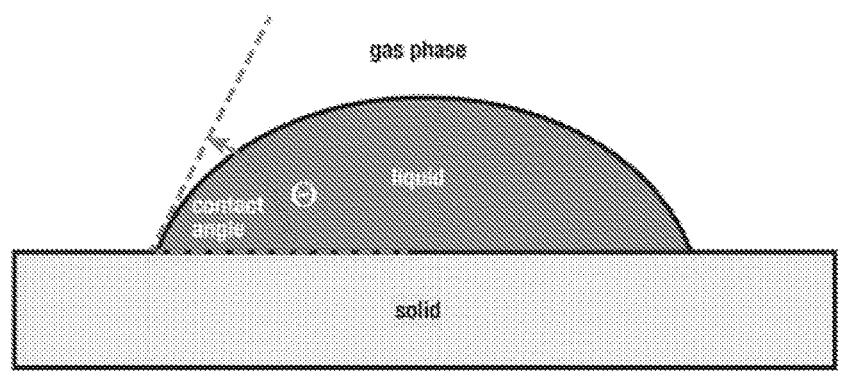
FIG. 1 illustrates one embodiment of an artificial turf system with an underlying drainage structure.
FIG. 2 illustrates conceptually the contact angle Θ.

One embodiment of the present invention is a method of constructing a sports field. FIG. 1 suggests the basic components of the sports field 75, which is also referred to as artificial turf system 75. Turf system 75 generally includes a stabilization layer 76 (e.g., a concrete layer) positioned on a compacted soil base, i.e., compacted subgrade 78. A water impervious liner 79 is positioned between subgrade 78 and stabilization layer 76. Positioned on top of the stabilization layer 76 is a drainage and shock attenuation blanket or layer 80. While the drainage blanket 80 can be any one of a number of conventional drainage materials or fabrics, in the FIG. 1 embodiment, drainage blanket 80 is a GeoFlo®. drainage and shock attenuation blanket available for Global Synthetics Environmental, LLC of St. Gabriel, La. Typically, the drainage blanket 80 is not attached to the stabilization layer, but is comparatively free moving with respect to the stabilization layer. An artificial turf layer 82 is placed over the drainage blanket layer 80, but not rigidly attached thereto except at the edges. In a preferred embodiment, the artificial turf layer 82 may be a product such as GeoGreen® replicated grass also available from Global Synthetics Environmental, LLC. The ends of drainage blanket and turf layers will be enclosed by the concrete border curb 87. Adjacent to the border curb 87 will be the drainage channel 84 filed with aggregate such as No. 57 stone. The perforated drainage pipe 85 will be positioned at the bottom of drainage channel 84. Typically, the subgrade 78 will be formed to have a grade line 90 with at least a ½% slope falling toward the border curb 87. Thus, rainfall on the turf system will be directed via drainage blanket 80 toward the drainage channel 84 and ultimately into drainage pipe 85. The drainage blanket 80, drainage channel 84, and drainage pipe 85 may be considered as part of a drainage base underlying the turf layer 82. The FIG. 1 drainage base is only one example and many other conventional and future developed drainage structures which divert water filtering through the turf layer could be employed. Nor is a specific drainage base required in all embodiments of the present invention, e.g., natural turf growing on ground having sufficient natural drainage.

Typically, the turf layer 82 has a granular infill material 1 spread over and into the "grass" portion of the turf. Sand is one typical prior art infill material and provides a more natural feel under foot and helps hold the turf in place. However, embodiments of the present invention will employ an infill material 1, which in preferred embodiments, is an orthorhombic calcium carbonate (CaCO$_3$). This mineral is more commonly referred to as Aragonite.

Aragonite is one of the three most common naturally occurring crystal forms of calcium carbonate, CaCO$_3$ (the other forms being the minerals calcite and vaterite). It is formed by biological and physical processes, including precipitation from marine and freshwater environments. The crystal lattice of aragonite differs from that of calcite, resulting in a different crystal shape, an orthorhombic crystal system with acicular crystal. Repeated twinning results in pseudo-hexagonal forms. Aragonite may be columnar or fibrous, occasionally in branching stalactitic forms. Typical examples of orthorhombic CaCO$_3$ are obtained from natural sources, but there could be examples of the material being artificial or man-made. One preferred variety of Aragonite is known as Oolitic Argonite because of its generally egg-shaped particles.

The infill material 1 need not be pure Aragonite and in some embodiments can be as low as 75% by weight Aragonite and 25% other filler materials, including sand if the application does not require a substantially silica-free infill material. However, there are many applications where it is desirable to have a substantially silica-free infill material. In those applications, silica will be less than about 5% by weight of the infill material and preferably, less than 1% by weight (and conceivably less than any percentage between 5 and 0.001). In most applications, the infill material will have an Aragonite content of between about 75% and 99.9% by weigh (e.g., "at least" some percentage between 75% and 99.9%) depending on application requirements. These weight percentages are for substantially dry infill material, i.e., a water content of less than 3% and more preferably, less than 1% by weight.

The distribution loading of the infill material (i.e., lbs of infill material applied per square foot of turf area) may vary between about 0.25 lbs/ft$^2$ and about 10 lbs/ft$^2$ for most turf applications (or any subrange in between). Longer and/or less dense yarn (the artificial "grass" blades) will suggest a heavier loading while shorter and/or more dense yarn will suggest a lighter loading. Nor is application of the infill material strictly limited to artificial turfs, but could have application to natural turfs or grass. Also, the infill material could have application in a play area as a substitute for sand, for example a child's sandbox or a "beach" volleyball court. In these applications, the infill material could be placed with a depth of anywhere between 2" and 12". A greater depth is possible, but typically is not necessary. In many embodiments, the play area is surrounded by a raised border to retain the infill material, e.g., boards, landscape timbers, or landscaping blocks. In certain embodiments, the play area is anywhere between 25 ft$^2$ and 2500 ft$^2$.

In many embodiments, the infill material will be sieved to have a size distribution within a 20/100 mesh ratio. In certain embodiments, this 20/100 mesh ratio means that no more than about 1% of the material remains on a 20 mesh screen and no more than 6% reaches the 100 mesh screen. In other embodiments, this 20/100 mesh ratio may mean that at least 85% of the sieved material remains within the 20/100 mesh range. In one particular embodiment, 0-5% passes 100 mesh, 10-20% is retained on 100 mesh, 38-48% is retained on 48 mesh, 18-28% is retained on 32 mesh, 12-22% is retained on 28 mesh, and at least 95% passes 20 mesh. The infill material will also typically have a crush rating of at least about 6.5 kpsi to at least about 9 kpsi (or any subrange in between). The crush rating is the load that may be placed on the material without producing 10% fines (fines being material passing through a 100 mesh screen). The specific gravity of the infill material (i.e., of individual grains of the material as opposed to its bulk density) will be at least 2.75, more preferably, at least 2.85, and most preferably, at least 2.9 (or at least any value between 2.75 and 3.0). The bulk density may range between 1.35 and 1.85 g/cm$^3$ (or any subrange in between, e.g., 1.42 to 1.59). Similarly, preferred embodiments of the infill material will have a Mohs hardness of between 3 and 4.5 (or any subrange in between). In certain embodiments, the infill materials will have a "roundness" classification based upon the British-Adopted European Standard BS EN 14955:2005, Surfaces for Sports Areas, of either B1, C1, or C2, with the roundness most preferably being C1. The infill will have this roundness classification when at least 75% of the individual grains of the infill material meet this roundness classification (or alternatively, at least 85%, 90%, 95%, or 99%).

Another embodiment of the present invention comprises a modified form of the above described Aragonite infill material. In this embodiment, the Aragonite granules are coated with a siloxane-based compound and/or silane-based compound. In a more preferred embodiment the coating is applied as a silicone siloxane aqueous emulsion. One example of this silicone siloxane aqueous emulsion is sold under the tradename HydroTek™ available from Warren Paint and Color Company of Nashville, TN (see Exhibit A of provisional application Ser. No. 63/323,722). In many embodiments, the coating is applied on the Aragonite granules to a thickness of between 0.25 μm and 1.0 μm (microns), with a more preferred thickness being between 0.5 μm and 0.75 μm. However, coating thickness anywhere between 0.1 μm and 10 μm are possibilities. In one application example, the range of coating thicknesses described above is obtained by wetting the surface of the granules with a siloxane-based liquid compound and/or silane-based liquid compound at a quantity of 1 gallon per 100 ft$^2$ to 1 gallon per 1000 ft$^2$ of specific surface area of the Aragonite infill. In certain embodiments, the coating may include a base polymer of acrylic, which is crosslinked with 1% activator, and cures at room temp in 24 hours after first application (drying time). In many embodiments, the coating will be substantially hydrophobic, with one example of substantial hydrophobicity being where water forms a contact angle θ with the coating of at least 80°. The contact angle θ is illustrated in FIG. 2, where at the edge of the drop (e.g., distilled water), the contour merges into the bearing surface (i.e., coating surface). The contact angle Θ is the angle between the interface liquid/solid and the tangent to the interface liquid/gaseous (i.e., air) forms. In more preferred embodiments of the coating, the contact angle θ is at least about 140°.

In another embodiment, the silicone siloxane aqueous emulsion (e.g., HydroTek) is applied as a percentage of total weight of Aragonite infill. Dried and screened (to the desired size range) Aragonite infill is placed in a Teflon coated auger or screw conveyor. Hydrotek is applied to the Aragonite material by spraying while the Aragonite material is in motion induced by the conveyor. In one preferred embodiment, the Hydrotek is applied at a rate of 1.5% by weight, i.e., Hydrotek is 1.5% by weight of the total mass of Aragonite material and Hydrotek liquid. In other embodiments, the Hydrotek could be applied at a rate anywhere between 0.25% and 4.0% by weight. After the Aragonite material combined with Hydrotek exits the auger, it will enter a vibrating pan and then be augered into piles in preparation for bagging or bulk loading.

In another embodiment of this process, an anti-static spray may be applied to the Hydrotek coated Aragonite material. In a preferred embodiment, the anti-static spray may be a compound such as Staticide® available from ACL Inc., of Chicago, IL (see Exhibit B of provisional application Ser. No. 63/323,722) and may be applied as a water/Staticide solution at a rate of less than a few percent by weight. In a further embodiment, paints or pigments may be included with the Hydrotek to impart different colors (e.g., shades of green) to the ultimate Aragonite infill material.

Another process for applying silicone-based coating to aragonite could include a batch process of applying to each ton of Aragonite the following constituents:

TABLE 1

| Constituent | Ounces | % Total | % Range |
|---|---|---|---|
| Paint (Part A) | 154 | 26.9 | 24-30 |
| Water | 410 | 71.5 | 74-78 |
| Part B coating | 5 | .87 | .7-1.0 |
| Anti-static (Staticide ®) | 4 | .70 | .6-.8 |
| Total | 573 | | |

The paint could be number of commercially available paints, including silicone-based paints. This paint (or paint system) could consist of a base component (often called the "Part A") and a catalyst or hardener component (often called the "Part B"). When these components are mixed together a chemical reaction starts that leads to the curing of the paint. About 4 to 5 gallons (preferably about 4.5 gallons) of the mixture of the constituents at the Table 1 ratios are then blended into one ton of Aragonite, preferably using a mechanical blender for at least 15 minutes of blending time. The coated Aragonite is allowed to dry/cure for 24 hours at ambient temperature. The dry/curing time may be accelerated by heating the coated Aragonite to approximately 150 to 160° F.

In alternative embodiments, the anti-static may applied as a separate step after application of the coating. For example, this separate anti-static application step might include using spray bars on a conveyor belt to coat the Aragonite with 99:1 parts water to Staticide 3000. The application rate will depend on the rate of TPH of material on the conveyor belt.

In certain embodiments, the infill material will be packaged as a bagged non-silica or low-silica play material, e.g., a substitute for sand. In such embodiments, the infill material will typically be placed in bags containing no more than 100 lbs of the infill material, and more preferably, bags of 50 lbs, or 25 lbs. In another embodiment, the infill material will be placed in a bag containing about 1 ton of infill material.

Many of the embodiments of the infill material described above have significant advantages over the prior art. The infill material is cradle to cradle in that it is a biomimetic approach to the design of infill systems which models natural processes, where materials are viewed as nutrients circulating in healthy, safe metabolisms. The infill materials are substantially renewable, non-toxic, silica-free, and contain no heavy metals or carcinogens. Moreover, Aragonite has the ability to bind with many heavy metals which may otherwise exist in the environment, thereby preventing metals from being ingested by persons coming into contact with the infill material.

The $CaCO_3$ infill material absorbs water at a rate similar to or higher than sand and slowly releases the moisture through the evaporative process (the process of liquid water evaporating from a surface which decreases the surface's temperature), which in turn allows this infill material to have a cooling effect on the surface surrounding or under the material. This cooling effect arises from the latent heat property of water. Water can hold heat without changing temperature, i.e., latent heat. Water has the ability to absorb heat from other surfaces, thereby preventing the secondary surface temperatures from rising as much as they otherwise would with conventional infill materials. When water absorbs enough heat, it evaporates, or changes phase from a liquid form to a gas form. The gas phase then leaves the surface and takes the absorbed heat with it. The result of this reaction is a decreased amount of heat and thus, decreased temperature in the surfaces around the infill material.

This ability to reduce temperature increase of the turf system can be quantified by techniques such as FIFA Test Method 14 for determination of heat on artificial turf products. See FIFA Quality Programme-46-Handbook of Test Methods for Football Turf, October 2015 (V.3.1, 16.03.2020). Under this FIFA Test Method, an artificial turf system employing the CaCO3 infill material is rated as Category 1 using the following scale:

TABLE 2

| (Categorization): | |
| --- | --- |
| Category | Temperature Range ° C. |
| Category 1 | <50 |
| Category 1-2 | 50-54 |

TABLE 2-continued

| (Categorization): | |
| --- | --- |
| Category | Temperature Range ° C. |
| Category 2 | 55-59 |
| Category 2-3 | 60-65 |
| Category 3 | >65 |

The hardness and roundness of the CaCO3 infill material also results in the infill material being less likely to be ground or reduce to very fine dust-like particles through sustained use as a sports field infill. A reduction in dust derived from the infill is not only more healthy for the sports field users, but also prevents the pores of the water-drainage layers beneath the turf layer from becoming clogged with the dust particles. Experimentation found that 20 mm of CaCO3 infill applied to a 40 mm artificial turf layer resulted in the following characteristics:

TABLE 3

| Characteristic | Value | Rating |
| --- | --- | --- |
| Ball rebound | 0.81 m dry and 0.87 m wet | FIFA Quality or Quality Pro range |
| Shock absorption | 58% dry and 59% wet | FIFA Quality Range |
| Deformation | 6.4 mm dry and 6.8 mm wet | FIFA Quality or Quality Pro range |
| Energy Restitution | 32% dry and 37% wet | Approximating natural turf |
| Rot Resistance | 49 Nm dry and 48 Nm wet | FIFA Quality Range |
| CFH | 1.4 m | meets the Rugby requirement |
| Gmax | 74 | |

It will be understood the invention is not limited to infill materials which have some or all or the above stated advantages. The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments+/−15%, or possibly as much as +/−20%. Similarly, the term "substantially" will typically mean at least 85% to 99% of the characteristic modified by the term. For example. "substantially all" will mean at least 85%, at least 90%, or at least 95%, etc.

The invention claimed is:

1. An aragonite-based infill material comprising:
   (a) at least 75% by weight aragonite granules within a 20/100 mesh ratio; and
   (b) an at least 0.5 μm thick coating formed on the granules, the coating being substantially hydrophobic, where water forms a contact angle Θ with the coating of at least 80°.

2. The infill material of claim 1, wherein the coating is ultra-hydrophobic where the contact angle Θ is at least 140°.

3. The infill material of claim 1, wherein the coating includes at least 75% by weight of a siloxane-based compound and/or silane-based compound.

4. A method of manufacturing an aragonite-based infill material comprising the steps of:
   (a) providing aragonite granules at least 75% by weight within a 20/100 mesh ratio; and
   (b) wetting the surface of the granules with a siloxane-based liquid compound and/or silane-based liquid compound, wherein the liquid compound is applied at a quantity of 1 gallon per 100 ft² to 1 gallon per 1000 ft² of specific surface area.

5. The method of claim 4, wherein the liquid compound a silicone siloxane aqueous emulsion.

6. The method of claim 4, wherein water forms a contact angle θ with the dried liquid coating of at least 80°.

7. A method of constructing a sports field comprising the steps of:

(a) placing a drainage base on a section of ground to be occupied by the sports field;

(b) placing an artificial turf over the drainage base;

(c) distributing an infill material over the artificial turf with a loading of between 0.5 and 8 lbs/ft², wherein the infill material comprises:

(i) at least 75% by weight orthorhombic $CaCO_3$ within a 20/100 mesh ratio; and (ii) a 0.25 um to 1.0 um thick coating formed on the granules, the coating consists essentially of a siloxane-based compound and/or silane-based compound.

8. The method of claim 7, wherein the infill material comprises at least 90% by weight orthorhombic $CaCO_3$.

9. The method of claim 7, wherein the infill material has a crush rating of at least 6.5 kpsi.

10. The method of claim 7, wherein the infill material has specific gravity of at least 2.85.

11. The method of claim 7, wherein the infill material has a silica content of less than 5%.

12. The method of claim 7, wherein the infill material has a Mohs hardness of between about 3.5 and about 4.

13. The method of claim 7, wherein the infill material at least 95% of the grains of infill material have a C1 roundness classification under the BS EN 14955:2005 standard.

* * * * *